US007940182B2

(12) United States Patent
Lange et al.

(10) Patent No.: US 7,940,182 B2
(45) Date of Patent: May 10, 2011

(54) RFID ENCODING FOR IDENTIFYING SYSTEM INTERCONNECT CABLES

(75) Inventors: Andrew Snowden Lange, Culver City, CA (US); Scott William Nelson, Paris (FR)

(73) Assignee: Alcatel Lucent, Paris (FR)

( * ) Notice: Subject to any disclaimer, the term of this patent is extended or adjusted under 35 U.S.C. 154(b) by 425 days.

(21) Appl. No.: 12/112,939

(22) Filed: Apr. 30, 2008

(65) Prior Publication Data

US 2009/0272794 A1 Nov. 5, 2009

(51) Int. Cl.

| | |
|---|---|
| ***G08B 13/14*** | (2006.01) |
| *G06F 17/00* | (2006.01) |
| *G06F 7/00* | (2006.01) |
| *G02B 6/44* | (2006.01) |

(52) U.S. Cl. ............... 340/572.1; 340/572.7; 340/572.8; 235/375; 700/215; 385/101

(58) Field of Classification Search ............... 340/572.1; 235/375

See application file for complete search history.

(56) References Cited

U.S. PATENT DOCUMENTS

| | | | | |
|---|---|---|---|---|
| 6,968,994 | B1 | 11/2005 | Smith | |
| 7,342,499 | B2 | 3/2008 | Chiu et al. | |
| 7,348,885 | B2 | 3/2008 | Chiu | |
| 7,760,094 | B1 * | 7/2010 | Kozischek et al. | 340/572.1 |
| 2004/0184747 | A1 * | 9/2004 | Koyasu et al. | 385/101 |
| 2005/0044759 | A1 * | 3/2005 | Schweikert | 40/299.01 |
| 2008/0133047 | A1 * | 6/2008 | Best et al. | 700/215 |
| 2008/0218355 | A1 * | 9/2008 | Downie et al. | 340/572.7 |

* cited by examiner

*Primary Examiner* — George A Bugg
*Assistant Examiner* — Jack Wang
(74) *Attorney, Agent, or Firm* — Kramer & Amado, PC

(57) ABSTRACT

The invention is directed to encoding information in radio frequency identifier (RFID) tags disposed on cabling interconnects for the purpose of easier identification of the cables, especially when ascertaining the physical routing and connectivity of the cables. The encoding can be performed before, during, or after installation of the cable. The encoded information can then be read at any time using an RFID reader, for example to identify the cable at various positions along it, thereby enabling easy determination of the routing of the cable.

32 Claims, 3 Drawing Sheets

RFID ENCODING FOR IDENTIFYING SYSTEM INTERCONNECT CABLES

FIELD OF THE INVENTION

The invention is directed to systems, or subsystems, interconnected by a plurality of cables, also referred to herein as cabling interconnects, and to the use of radio frequency identifier (RFID) technology for identifying such cables.

BACKGROUND OF THE INVENTION

Evolution of network technologies resulted in a world of interconnected networks where businesses and households are now amazingly close to each-other. The notion of "network" turns out to be central to our times: the Internet, LANs, WANs, enterprise networks, home networks, etc. are today interconnected over the World Wide Web, changing our lives and the way we do business. This evolution presents significant challenges to service and network providers, which attempt to serve their clients faster and better, by continuously enlarging and upgrading their networks with a view to serve a growing number of clients and to implement the latest advances in networking technologies.

Typically, the equipment is situated in an environmentally hardened enclosure, such as a cabinet, or in a central office (CO) or a point-of-presence office which is generally environmentally controlled. Because the cost of space in these environments is high, the equipment is commonly organized in the most compact manner that is practical. As a result, there is often a confusing collection of cabling running through the environment to interconnect the equipment within the respective location (office, cabinet, etc) both to other equipment within the location and to equipment outside of the location.

Network deployment and upgrading presents complex challenges to providers, one of which is managing interconnections between equipment of various size, make and functionality (also referred to here as systems) that make-up the network.

Thus, techniques to ascertain the existing physical cabling connections between various systems within a certain location (e.g. a Central Office) are needed. These techniques would also apply to cabling connections of electronic systems in general, in situations where there are numerous systems to be interconnected at a particular installation site and there are a very large number of electrical or optical cables interconnecting them, such that there exists a very real possibility of incorrect connections and wherein determining the exact nature of the interconnection errors would be a very onerous and time consuming task. In addition, these techniques should be equally applicable to cables made of optical fiber or copper.

It is known to attach identifying tags to cabling; this may be as simple as attaching a paper tag with a tie-wrap or writing on a piece of tape that is adhered to the cable. However, physical tags may become separated from the cables and the labels may be rendered illegible. Further, locating a particular tag amongst a great many tagged cables in a crowded environment may be difficult.

It is also known to use unique connectors. The connectors may be affixed to multiple cables and have a geometry that allows insertion into only one type of device in one particular way. However, the connectors must be connected to the cables in the proper way. Further, designing and manufacturing unique connectors for a very large number of cables is difficult and relatively costly because each can only serve a particular function and production runs tend to be in relatively small numbers.

RFID technology, although nascent, is known for improving supply chain efficiency by facilitating tracking of goods. For example, RFID may displace the bar codes currently used to identify products. An RFID tag includes an antenna and a small, inexpensive circuitry chip which stores data such as a product's expiration date and Electronic Product Code (EPC). The circuitry is responsive to a particular RF signal transmitted by a reader to generate a corresponding signal including the stored data. The range of the corresponding signal is dependent on various factors, but may be effective up to ten meters.

For example, Hewlett Packard and Connectivity Technologies offer solutions in this area, particularly using RFID tags at the ends of cables and RFID readers at the input/output (I/O) interfaces of systems interconnected by the cables to read the tags, thereby identifying which endpoint of cables are connected to which I/O interfaces. The cable identification information is then sent to an Operation Support System (OSS) or Network Management System (NMS) that uses the information to determine the interconnection of the systems, which is made available to an operator, e.g. as a network map. However, this solution does not determine the physical layout of the cabling, which can be important for repairing or replacing faulty cables or to locate cables for various reasons, e.g. system relocation, site construction/maintenance, etc.

A system for locating the geographical position of network elements in a network has also been proposed, as described in the US patent application publication number 20030109267 (Bulut) filed on Jun. 12, 2003 and entitled "Network element locating system". This patent application describes equipping network equipment with locators and connecting into the network a position manager. The locators acquire location information for the respective equipment and store it as position data. The equipment transmits the position data to the position manager over the network on request, and the position manager provides the user with the location of the equipment. However, this solution is mostly concerned with locating the equipment in case of faults and does not address the problem of determining the physical layout of the cabling.

Therefore, it would be desirable to have a solution to determine the physical routing of cables interconnecting communications systems for various purposes including repair or replacement of faulty cables, relocation of the communications systems, and maintenance or reconstruction of the immediate environment of the cables or the communication systems.

SUMMARY OF THE INVENTION

The invention is directed to encoding information in radio frequency identifier (RFID) tags disposed on cabling interconnects for the purpose of easier identification of the cables, especially when ascertaining the physical routing and connectivity of the cables.

Embodiments of the invention enable easy and efficient writing, or encoding, of identification information into RFID tags disposed along a cable interconnecting systems or subsystems. The encoding can be performed before, during, or after installation of the cable. The encoded information can then be read at any time using an RFID reader, for example to identify the cable at various positions along it, thereby enabling easy determination of the routing of the cable.

According to an aspect of the invention there is provided an RFID encoder for encoding information on RFID tags disposed on a cable. The RFID encoder includes an RFID interface for interfacing with the RFID tags; a controller operable to control the RFID interface to accomplish encoding of the information on the RFID tags; and a guide for positioning the cable in a correct position for encoding a selected on RFID tag.

In some embodiments of the invention, the guide includes one or both of two cable guides and a proximity detector. Each of the cable guides is situated on the RFID encoder such that both cable guides align with the longitudinal axis of the cable when the cable is positioned in both of the cable guides. The cable guides help hold the cable in correct alignment with the RFID encoder during an encoding operation. The proximity detector is for determining whether or not the selected RFID tag is within a range of positions for successful encoding of that RFID tag.

According to another aspect of the invention there is provided a method of encoding RFID tags disposed on a cable. The method includes the steps of positioning the cable in a first position with respect to an RFID encoder for encoding a first RFID tag of the RFID tags, and encoding a cable identifier into the first RFID tag.

According to yet another aspect of the invention there is provided a cable comprising a plurality of RFID tags disposed at approximately equal intervals along its length.

According to still another aspect of the invention there is provided a cable bundle comprising a plurality of cables held in close proximity to each other along their longitudinal axis by sheathing and a plurality of RFID tags disposed at approximately equal intervals along the sheathing.

Advantageously, embodiments of the invention could be used by network and service providers to troubleshoot cabling interconnection problems of communications equipment, both electrical and optical interconnections, as well as other types of electronic systems in general. Important reductions in the time needed to troubleshoot cablings errors may be obtained by addressing the problem of easily and accurately determining the physical routing of cables, e.g. of interconnection systems in a Telco's CO, Enterprise's datacenters or other cabling applications.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
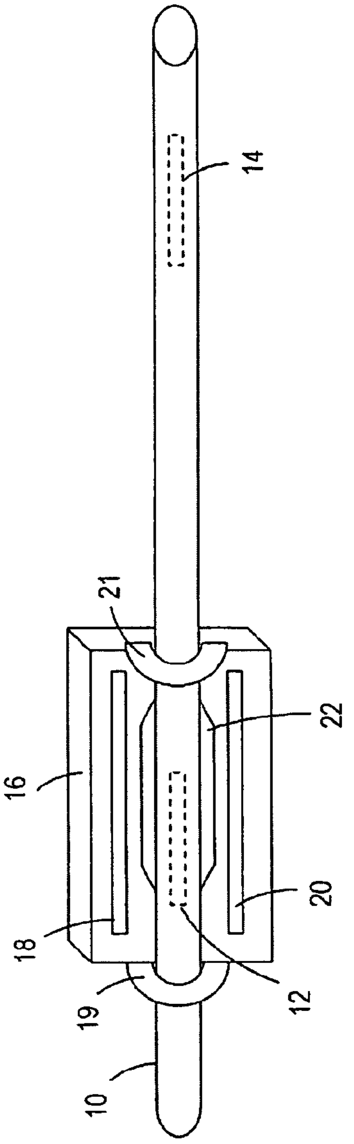
FIG. 1 illustrates an RFID encoder according to an embodiment of the invention.

Referring to FIG. 1, a cable 10 is equipped with multiple RFID tags 12, 14 disposed at approximately equal intervals along its length. The RFID tags 12, 14 each have an antenna that aligns lengthwise with the longitudinal axis of the cable 10. The RFID tags 12, 14 are drawn in dotted line to denote that they are on the backside of the cable 10 with respect to the point of reference of the viewer. An RFID encoder 16 is shown behind the cable 10 in a position to read or write to the RFID tag 12.

The RFID encoder 16 includes proximity sensors 18, 20 on a face adjacent to the cable 10. The proximity sensors are used when an RFID tag 12 is being encoded by the RFID encoder 16 to verify that the RFID tag 12 is in a correct position for the encoding operation. The RFID encoder 16 also includes cable guides 19, 21 protruding from the face at either end of the RFID encoder 16 and situated such they align with the longitudinal axis of the cable 10, thereby enabling the cable 10 to pass through the cable guides 19, 21 during write and read operations of RFID tags disposed on the cable 10. Each of the cable guides 19, 21 is shown as surrounding the cable 10 against the face of the RFID encoder 16; however each cable guide could alternatively be a pair of prongs through which the cable 10 passes. Each cable guide 19, 21 could be fixed such the cable must be passed through it, or it could open, e.g. being pivoted at one end, to allow the cable to be inserted therein, and then be closed around the cable 10. The cable guides 19, 21 may be adjustable to accept various sizes of cables while keeping the cable 10 in the correct position for the encoding operation.

The RFID encoder 16 also includes a coupling device 22 used in interfacing with the RFID tags 12, 14. The coupling device 22 would typically be an RF antenna for transmitting RF signals to, and receiving RF signals from, the RFID tags 12, 14. However, other ways of interfacing with RFID tags 12, 14 are known, for example using capacitive coupling to encode RFID tags 12, 14. In that case the coupling device 22 would be a specifically formed capacitive plate or grid.

The RFID encoder 16 is portable and has a physical structure adapted for handheld operation by a user. That is, the physical structure of the RFID encoder 16 is of a size and weight that allows for easy handheld operation and includes a feature such as a handle that enables a user to easily grasp the RFID encoder in one hand.

Figure 2:
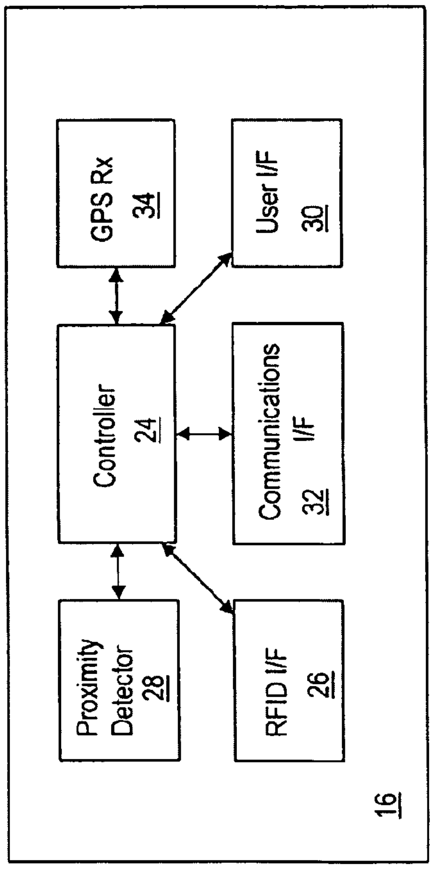
FIG. 2 is a functional block diagram of the RFID encoder of FIG. 1.

Referring to FIG. 2, the RFID encoder 16 includes several functions which are depicted as functional blocks in this diagram. The RFID encoder 16 includes a controller 24 that preferably comprises a central processing unit (CPU) and memory in which a control program is stored and is executed by the CPU to communicate with, and control as necessary, other functional blocks to carry out operations such encoding and reading RFID tags 12, 14 as well as other functions, which will be explained later. The controller 24 also has the capability, via the aforementioned memory or another memory, to store data that will be written to, and data that has been read from, the RFID tags 12, 14. The controller 24 is coupled to an RFID interface (I/F) 26, which is used for physically interfacing with the RFID tags 12, 14, for example by RF signals or capacitive coupling. The RFID interface 26 includes the previously mentioned coupling device 22 and associated electronics for generating the necessary electrical signals to drive it under the control of the controller 24. For example, in the case of RF coupling the coupling device 22 would be an RF antenna and the associated electronics would be an RF transmitter and receiver, or transceiver, which operate under the control of the controller 24.

The RFID encoder 16 also includes a proximity detector 28 for determining the position of the cable 16 and RFID tags 12, 14 with respect to the RFID encoder 16. The proximity detector 28 includes the proximity sensors 18, 20 and associated electronics necessary to interface with the controller 24, to which it is coupled. The proximity detector 28 provides a positive verification signal to the controller 24, indicating that an RFID tag 12 is in a correct position for performing an encoding operation on the RFID tag, both before and during the encoding operation. The correct position could actually fall within a range of positions for successful encoding of the RFID tag 12. If the RFID tag 12 being encoded moves outside this range of positions during the encoding operation the positive verification signal would be de-asserted, which would be indicated to a user. The proximity detector 28 can operate autonomously, or perform a proximity determination on request by the controller 24, for example before an encoding operation is initiated. The proximity detector 28 can also trigger an encoding operation via positive verification signal when an RFID tag 12 is detected as being in the correct position for performing an encoding operation. For example, this would be useful when the RFID encoder 16 is in a sequential write mode in which the RFID encoder 16 is quickly passed over a length of cable and RFID tag 12 disposed thereon are sequentially encoded automatically as each moves into the correct position for encoding.

The RFID encoder 16 also includes a user interface 30 coupled to the controller 24. The user interface 30 includes a display and a keypad for communicating information to and from a user, respectively. Alternatively, or additionally, the display could be of the touch screen type for receiving user input. Information communicated to the user includes information read from RFID tags embedded in or affixed to the cable 10. Information communicated to the RFID encoder 16 from the user includes information to be written to the RFID tags. Examples of both types of information will be given later with reference to FIG. 3. The user interface 30 also provides the user with a capability to initiate RFID tag read and write operations and provides indications associated therewith as previously described, as well as providing an interface to change the operational mode of the RFID encoder 16.

The RFID encoder 16 also includes a communications interface 32 coupled to the controller 24. The communications interface 32 includes ports for wired communications, such as a serial and parallel port, as well capabilities for wireless communications, such as a transceiver and an antenna, e.g. for Wi-Fi or Bluetooth communications. The communications interface 32 also includes electronics associated with serial and parallel ports such as physical layer drivers, receivers, and buffers. Specialized devices for implementing one or more communication protocols may be included in the communications interface 32. Alternatively, implementation of one or more of these protocols could be accomplished by software executed by the controller 24. The communications capabilities provided by the communications interface 32 are useful for communicating information between the RFID encoder 16 and another system such as a network node or management system, e.g. an operation support system (OSS) or network management system. In particular, such information would include information read from, or to be written to an RFID tag 12 such as a cable identifier and a network identifier.

The RFID encoder 16 also includes a global positioning system (GPS) receiver 34 coupled to the controller 24. The GPS receiver 34 is operable to receive GPS signals which indicate the global position of the GPS receiver 34. This global position can be encoded in the RFID tag 12 for purpose of accurately locating the cable 10 on which the RFID tag 12 is disposed when the contents of the RFID tag 12 is read. Alternatively to encoding the global position on the RFID tag 12, the global position could be associated with identifiers read from the RFID tag 12, e.g. a cable identifier and a tag identifier, and transmitted to a management system for recording the physical routing of the cable 10.

Figure 3:
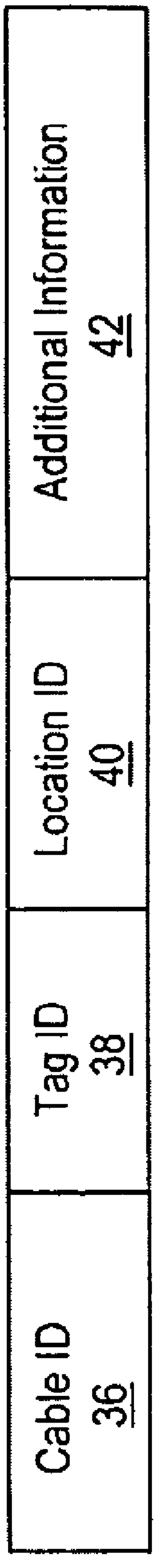
FIG. 3 shows the format of information stored in the RFID tags of FIG. 1.

With reference to FIG. 3, the format and contents of information encoded on the RFID tags 12, 14 will now be described. This encoded information includes a cable identifier 36, a tag identifier 38, a location identifier 40, and optional additional information 42. The cable identifier 36 is preferably unique to the premises at which the cable 10 is installed. The cable identifier 36 could be assigned at the time of encoding the RFID tags 12, 14 before or during installation of the cable 10, or it could be downloaded from a network node or management system via the communications interface 32 during or after installation of the cable 10. The tag identifier 38 uniquely identifies the RFID tag 12, 14 onto which it is encoded with respect to at least the cable 10 on which the RFID tag 12, 14 is disposed. For example, the tag identifier 38 could be a sequence number that is local to the cable 10 or it could be a distance of the RFID tag 12, 14 with respect to one end of the cable 10. The location identifier 40 provides positional information of the RFID tag 12, 14. For example, the location identifier 40 could be a global position obtained via the GPS receiver 34 or positional information with respect the premises at which the cable 10 is installed (e.g. building E floor 2; pillar 2A; conduit 15). The optional additional information 42 includes information such as a network identifier, a network operator identifier, or a customer identifier.

The RFID tags 12, 14 are preferably re-writeable or one-time programmable (OTP) passive RFID tags 12, 14 typically belonging to EPC types class 0+ or class 1 high frequency (HF), or class 1 ultrahigh frequency (UHF) generation 2 (GEN2) depending on the application. The HF RFID tags 12, 14 operate at 13 MHz and have a read range of about 3 feet, while the UHF RFID tags 12, 14 operate at 900 MHz and have a read range of 3 to 10 feet or more. In some applications, the smaller range and better penetration of the HF RFID tags 12, 14 may be more desirable than the UHF RFID tags 12, 14, for example in installations having a very large number of collocated cables. If an EPC code is to be used in the RFID tags 12, 14, which code is typically 96 bits in length, the GEN2 tags 12, 14 should be used because they have an extra 160 bits of memory for storing additional information. Passive RFID tags 12, 14 with up to 1 kilobyte of non-volatile memory are currently available. Preferably, the RFID tags 12, 14 would be under the sheathing of the cable.

Numerous modifications, variations and adaptations may be made to the embodiment of the invention described above without departing from the scope of the invention, which is defined in the claims.

Figure 4:
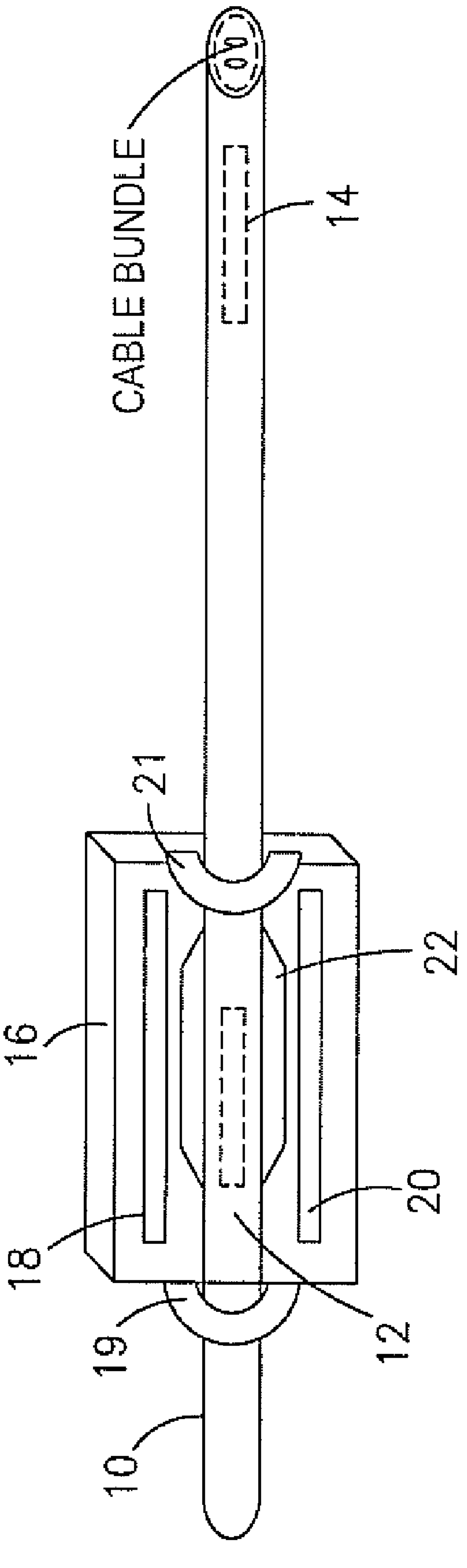
FIG. 4 illustrates an RFID encoder according to an embodiment that uses a cable bundle.

An example of a variation of the RFID tags 12, 14, which in the described embodiment are disposed such that the antenna of each RFD tag 12 is aligned with the longitudinal axis of the cable or cable bundle 10, as depicted in FIG. 4, would to position one or more RFID tags 12, 14 such that the antenna of each either fully or partially encircles the cable or cable bundle 10 transversely to said longitudinal axis or even in a helical manner. Further, one or more of the RFID tags 12, 14 may have multiple antennas, wherein each antenna of a given RFID tag 12 has a different orientation with respect to other antenna of the same RFID tag 12. This arrangement could be implemented for better transmission from and reception by the given RFID tag 12.

Other variations to how RFID tags 12, 14 are disposed on a cable 10 besides the described technique of embedding the RFID tags 12, 14 beneath cable sheathing include affixing the RFID tags 12, 14 to the outside of the cable 10. Furthermore, embedding the RFID tags 12, 14 beneath the cable sheathing should be understood to include affixing the RFID tags 12, 14 to a particular conductor or fiber of the cable 10, over which the sheathing is applied. The same principles of disposing the RFID tags 12, 14 with respect to cables and conductors or fibers therein as well as cable sheathing apply equally to cable bundles 10 and their cables and sheathing. Furthermore, in cases where an RFID tag 12 is embedded beneath cable sheathing, a marking on the sheathing that indicates the location of the RFID tag 12, e.g. directly opposite the RFID tag 12 on the outside of the sheathing, could be advantageous.

An example of a modification to the information stored in the RFID tags 12, 14 would be to encrypt all or part of the information to be encoded on a given RFID tag 12 and then to encode that RFID tag 12 with the encrypted information. This encryption could be performed by the controller 24 executing a software program for performing the encryption, or the encrypted information could be received by the RFID encoder 16 via the communication interface 32. In some applications, the additional security provided by such a technique could be desirable, depending on the information being written to the RFID tag 12 and security vulnerabilities present at the premises at which the cable or cable bundle 10 is installed. A variation of the information stored on RFID tags 12, 14 would be to store a pointer to all or part of the information. This would be useful in cases where the memory storage space on an RFID tag 12 is too-small to contain all the desired information. The pointer could be used as a database index into an external system that stores more detailed information. For example: ABCD12345678 could index into "Cable 123511B, Conduit XYZ from LAX to DEN, Installed 813104, Tested Aug. 4, 2004, Cable Path: LAX—Palm Springs—Phoenix—Colorado Springs—DEN".

An example adaptation could be made to the use of the RFID encoder 16 when operating in the aforementioned sequential write mode. In this scenario a cable manufacturer may pre-encode the RFID tags 12, 14 of an entire spool of cable 10. For example, the encoded information on a given RFID tag 12 could be a unique manufacturer ID instead of the cable identifier 36 and the tag identifier 38 could represent a distance from one end of the cable 10, the latter being as previously described. In this case it would be advantageous to have the RFID encoder 16 control a cable feeder that advances the cable 10 after each RFID tag 12 is successfully encoded. In this application the aforementioned positive verification signal could be communicated to the cable feeder via the communications interface 32 to control advancement of the cable 10. Alternatively, or additionally, the RFID encoder 16 could read back information just encoded on an RFID tag 12 and to verify that the information was successfully encoded; and responsive verification of such success, provide a signal to the cable feeder via the communications interface 32 to initiate advancement of the cable 10 to the next RFID tag 12 to be encoded.

What is claimed is:

1. A radio frequency identifier (RFID) encoder for encoding information on RFID tags disposed on a cable, the RFID encoder comprising:

an RFID interface for interfacing with the RFID tags;

a controller operable to control the RFID interface to accomplish encoding of the information on the RFID tags; and a guide for positioning the cable in a correct position for encoding a selected RFID tag of the RFID tags, wherein the guide further comprises at least one cable guide that permits the RFID encoder to move along a longitudinal axis of the cable, so that the RFID encoder is capable of encoding the RFID tags.

2. The RFID encoder of claim 1, wherein the guide further comprises two cable guides situated on the RFID encoder such that the two cable guides align with the longitudinal axis of the cable when the cable is positioned in both of the cable guides.

3. The RFID encoder of claim 1, wherein the at least one cable guide includes a pair of prongs between which the cable can be positioned.

4. The RFID encoder of claim 2, wherein the two cable guides are adjustable to accept various sizes of cables.

5. The RFID encoder of claim 1, wherein the guide further comprises:

a proximity detector for determining whether or not the selected RFID tag is within a range of positions for successful encoding of the selected RFID tag.

6. The RFID encoder of claim 1, further comprising:

a communications interface for wirelessly receiving at least a part of the information.

7. The RFID encoder of claim 1, further comprising:

a global positioning receiver for receiving a GPS signal, from which the RFID encoder is operable to determine its global position and encode an indication of this global position on the selected RFID tag.

8. The RFID encoder of claim 1, further comprising:

a user interface operable to receive input from a user, the input providing an indication of at least part of the information to be encoded on the selected RFID tag.

9. The RFID encoder of claim 1, wherein the RFID encoder is portable and has a physical structure adapted for handheld operation by a user.

10. A method of encoding RFID tags disposed on a cable, the method comprising:

positioning, with a guide, the cable in a first position with respect to an RFID encoder for encoding a first RFID tag of the RFID tags, wherein the guide further comprises at least one cable guide that permits the RFID encoder to move along a longitudinal axis of the cable, so that the RFID encoder is capable of encoding the RFID tags; and encoding a cable identifier into the first RFID tag.

11. The method of claim 10, wherein the step of positioning comprises using a guide to align the cable in the first position.

12. The method of claim 10, wherein the step of positioning further comprises:

determining whether the first RFID tag is within a range of positions for successful encoding of the first RFID tag, and, if not in the range, repositioning the cable to put the first RFID tag in the range.

13. The method of claim 12, wherein the step of determining further comprises:

using a proximity detector to make the determination.

14. The method of claim 10, further comprising:

encoding a first tag identifier into the first RFID tag, the first tag identifier being at least unique to the cable.

15. The method of claim 14, wherein the first tag identifier represents a distance of the first RFID tag from one end of the cable.

16. The method of claim 14, further comprising:

encoding a first location identifier representing a location of the RFID tag when the cable is installed for operation.

17. The method of claim 16, further comprising:

receiving at the RFID encoder any of the cable identifier, the first tag identifier, and the first location identifier from a management entity.

18. The method of claim 10, further comprising:

repositioning the cable in a second position with respect to the RFID encoder for encoding a second RFID tag of the RFID tags; and encoding any of the cable identifier, a second tag identifier, and a second location identifier into the second RFID tag.

19. A cable system comprising:

a plurality of RFID tags disposed at approximately equal intervals along a longitudinal axis of a cable; and a guide for positioning the cable in a correct position for encoding a selected RFID tag of the RFID tags, wherein the guide further comprises at least one cable guide that permits the RFID encoder to move along a longitudinal axis of the cable, so that the RFID encoder is capable of encoding the RFID tags.

20. The cable system of claim 19, wherein the RFID tags are encoded with information that includes a cable identifier.

21. The cable system of claim 20, wherein the information includes a tag identifier.

22. The cable system of claim 21, wherein the tag identifier is any of: a sequence number that is local to the cable or a distance of the RFID tag with respect to one end of the cable.

23. The cable system of claim 22, wherein the information further includes a location identifier representing a location of the RFID tag when the cable is installed for operation.

24. The cable system of claim 23, wherein the location identifier represents any of: a global position of the RFID tag or positional information of the RFID tag with respect to premises at which the cable is installed.

25. The cable system of claim 24, wherein the information further includes any of: a network identifier, a customer identifier, and a network operator identifier.

26. A cable bundle system comprising:

a plurality of cables held in close proximity to each other along their longitudinal axes by sheathing;

a plurality of RFID tags disposed at approximately equal intervals along the sheathing; and a guide for positioning the cable bundle in a correct position for encoding a selected RFID tag of the plurality of RFID tags, wherein the guide further comprises at least one cable guide that permits the RFID encoder to move along a longitudinal axis of the cable, so that the RFID encoder is capable of encoding the RFID tags.

27. The cable bundle system of claim 26, wherein the RFID tags are encoded with information that includes a cable identifier.

28. The cable bundle system of claim 27, wherein the information includes a tag identifier.

29. The cable bundle system of claim 28, wherein the tag identifier is any of a sequence number that is local to the cable bundle or a distance of the RFID tag with respect to one end of the cable bundle.

30. The cable bundle system of claim 29, wherein the information further includes a location identifier representing a location of the RFID tag when the cable bundle is installed for operation.

31. The cable bundle system of claim 30, wherein the location identifier represents any of a global position of the RFID tag or positional information of the RFID tag with respect to premises at which the cable bundle is installed.

32. The cable bundle system of claim 31, wherein the information further includes any of a network identifier, a customer identifier, and a network operator identifier.

* * * * *